United States Patent
Mandel et al.

(10) Patent No.: US 8,932,109 B2
(45) Date of Patent: Jan. 13, 2015

(54) METHOD FOR PRODUCING MULTIPLE-PHASE SURFACES

(76) Inventors: Kostia Mandel, Netanya (IL); Sergei Stefanidin, Winnipeg (CA); Boris Shamshidov, Or Akiva (IL); Shai Aviezer, Moshav Shilat (IL); Rina Mandel, legal representative, Netanya (IL)

(*) Notice: Subject to any disclaimer, the term of this patent is extended or adjusted under 35 U.S.C. 154(b) by 1191 days.

(21) Appl. No.: 12/742,437

(22) PCT Filed: Nov. 12, 2008
(Under 37 CFR 1.47)

(86) PCT No.: PCT/IL2008/001487
§ 371 (c)(1),
(2), (4) Date: Dec. 20, 2010

(87) PCT Pub. No.: WO2009/063457
PCT Pub. Date: May 22, 2009

(65) Prior Publication Data
US 2011/0111676 A1  May 12, 2011

Related U.S. Application Data

(60) Provisional application No. 60/987,112, filed on Nov. 12, 2007.

(51) Int. Cl.
*B24B 1/00* (2006.01)
*B24B 37/04* (2012.01)

(52) U.S. Cl.
CPC .................................. *B24B 37/042* (2013.01)
USPC ................................ 451/36; 428/545; 451/59

(58) Field of Classification Search
CPC ...... B24B 37/042; B24B 37/14; B24B 37/04; B24B 37/044; B24B 37/24; B24B 1/00; B24B 7/22; B24B 29/02
USPC .......................... 428/545; 451/36, 59, 60, 63
See application file for complete search history.

(56) References Cited

U.S. PATENT DOCUMENTS

2002/0110661 A1* 8/2002 Kuramochi et al. ......... 428/64.1
2004/0023610 A1 2/2004 Hu et al.
(Continued)

OTHER PUBLICATIONS

Intl PCT Search Report for PCT/IL2008/001487.
(Continued)

*Primary Examiner* — Timothy V Eley
(74) *Attorney, Agent, or Firm* — Mark M. Friedman

(57) ABSTRACT

A workpiece having a multiple-phase working surface, and a lapping process for producing the surface, the process including: (a) providing a system including: (i) a workpiece having a multiple-phase working surface having a first continuous solid phase, and a second solid phase, intimately dispersed within the continuous phase in the multiple-phase working surface, the continuous phase having a hardness exceeding a hardness of the second phase by a Mohs Hardness of at least 0.5; (ii) a contact surface, disposed generally opposite the working surface, having a Shore D hardness within a range of 40-90, and a Young's modulus of less than 20 gigapascals; (iii) a plurality of abrasive particles, freely disposed between the contact and working surfaces, and (b) lapping the working surface by exerting a pressure on the surfaces and applying a relative motion between the surfaces, to effect an elastic interaction between the contact surface and the abrasive particles in which at least a portion of the abrasive particles penetrate the working surface, to produce a lapped product having a modified working surface, in which an exterior surface of the second phase is recessed by an average of at least 1.5 micrometers with respect to an exterior surface of the continuous phase.

14 Claims, 13 Drawing Sheets

(56) References Cited

U.S. PATENT DOCUMENTS

2005/0118939 A1 6/2005 Duescher
2007/0123152 A1 5/2007 Shteinvas et al.
2007/0135023 A1 6/2007 Shamshidov et al.

OTHER PUBLICATIONS

Intl PCT Search Opinion for PCT/IL2008/001487.
Intl PCT Preliminary Patentability Opinion for PCT/IL2008/001487.

* cited by examiner

FIGURE 12A  Cast Iron (spheroidal graphite) before treatment  Zoom x ~500

FIGURE 12B  Cast Iron (spheroidal graphite) after treatment  Zoom x ~500

METHOD FOR PRODUCING
> MULTIPLE-PHASE SURFACES

CROSS-REFERENCE TO RELATED APPLICATIONS

This application is a National Stage application filed under 35 U.S.C. §371 of PCT/IL2008/001487 filed on Nov. 12, 2008 which is hereby incorporated by reference in its entirety. This application draws priority from U.S. Provisional Patent Application Ser. No. 60/987,112 filed Nov. 12, 2007.

FIELD AND BACKGROUND OF THE INVENTION

The present invention relates to improved multiple-phase tribological surfaces, and to methods and systems for producing such surfaces, and more particularly, to polymer lapping methods and systems for producing such multiple-phase surfaces.

Many types of multiple-phase or composite metal materials are used in the production of tribological surfaces, which are sometimes referred to as sliding surfaces. Multiple-phase tribological surfaces are often characterized by components of varying degree of hardness. Cast irons, by way of example, typically contain about 2% to 4% graphite; the Mohs hardness of the cast iron is about 6-8, and the Mohs hardness of the graphite enclosures is about 1-2.

SUMMARY OF THE INVENTION

According to the teachings of the present invention there is provided a lapping process for producing a modified multiple-phase working surface, including the steps of: (a) providing a system including: (i) a workpiece having a multiple-phase working surface including: (A) a first continuous solid phase; (B) a second solid phase, intimately dispersed within the continuous phase in the multiple-phase working surface, the continuous phase having a hardness exceeding a hardness of the second phase by a Mohs Hardness of at least 0.5; (ii) a contact surface, disposed generally opposite the working surface, the contact surface having a Shore D hardness within a range of 40-90, and a Young's modulus of less than 20 gigapascals (GPa); (iii) a plurality of particles, including abrasive particles, the plurality of particles freely disposed between the contact surface and the working surface, and (b) lapping the multiple-phase working surface by exerting a pressure on the contact surface and the multiple-phase working surface, and applying a relative motion between the working surface and the contact surface, to effect an at least partially elastic interaction between the contact surface and the abrasive particles in which at least a portion of the abrasive particles penetrate the working surface, to produce a lapped product having the modified multiple-phase working surface, in which an exterior surface of the second phase is recessed by an average of at least 1.5 micrometers with respect to an exterior surface of the continuous phase.

According to another aspect of the present invention there is provided a workpiece having a multiple-phase working surface produced by the inventive lapping process.

According to another aspect of the present invention there is provided a workpiece including a multiple-phase working surface including: (A) a first continuous solid phase; (B) a second solid phase, intimately dispersed within the continuous phase in the multiple-phase working surface, the continuous phase having a hardness exceeding a hardness of the second phase by a Mohs Hardness of at least 0.5, and in which the second phase is a recessed phase having an exterior surface that is recessed by an average of at least 1.5 micrometers with respect to an exterior surface of the continuous phase.

According to further features in the described preferred embodiments, the Young's modulus of the contact surface is less than 7 GPa, preferably less than 2 GPa, and typically less than 0.8 GPa.

According to still further features in the described preferred embodiments, the pressure on the contact surface and the multiple-phase working surface is at least 0.05 megapascals (MPa), typically at least 0.1 MPa, and more typically, at least 0.5 MPa or at least 1 MPa.

According to still further features in the described preferred embodiments, the multiple-phase working surface includes a cast-iron surface, wherein the first solid phase includes ferrite and the second solid phase includes graphite.

According to still further features in the described preferred embodiments, the graphite is predominantly a spheroidal graphite.

According to still further features in the described preferred embodiments, the graphite is predominantly a laminar graphite.

According to still further features in the described preferred embodiments, during exertion of the pressure and applying the relative motion, a temperature at the contact surface increases to at least 35° C., wherein the Young's modulus is reduced to less than 2 GPa, and typically, to less than 0.8 GPa.

According to still further features in the described preferred embodiments, the lapping of the multiple-phase working surface is an initial lapping procedure, and the pressure on the contact surface and the multiple-phase working surface during the initial lapping procedure is maintained above 0.05 megapascals (MPa), and typically, above 0.1 MPa, or even above 0.5 MPa.

According to still further features in the described preferred embodiments, the initial lapping procedure is a sole, single-stage lapping procedure.

According to still further features in the described preferred embodiments, prior to the initial lapping procedure, the multiple-phase working surface has a surface roughness ($R_a$) of at least 0.25 micrometers, and after the initial lapping procedure, a surface roughness ($R_a$) of the continuous phase is reduced below 0.05 micrometers.

According to still further features in the described preferred embodiments, a predominant fraction of the abrasive particles is alumina.

According to still further features in the described preferred embodiments, prior to the initial lapping procedure, the multiple-phase working surface has a surface roughness ($R_a$) of at least 0.35 micrometers, and after the initial lapping procedure, a surface roughness ($R_a$) of the continuous phase is reduced below 0.07 micrometers.

According to still further features in the described preferred embodiments, prior to the initial lapping procedure, the multiple-phase working surface has a surface roughness ($R_a$) of at least 0.25 micrometers, and after the initial lapping procedure, a surface roughness of the continuous phase is reduced below 0.05 micrometers.

According to still further features in the described preferred embodiments, the abrasive particles having a Mohs hardness of at least 7.5.

According to still further features in the described preferred embodiments, the abrasive particles include ceramic particles.

According to still further features in the described preferred embodiments, the abrasive particles are disposed in an abrasive paste containing 5% to 90%, by weight, of the abrasive particles.

According to still further features in the described preferred embodiments, the abrasive paste contains an organic acid having at least one unsaturated carbon-carbon bond.

According to still further features in the described preferred embodiments, the abrasive particles are disposed in an abrasive paste initially containing 5% to 90%, by weight, of the abrasive particles, and at least 90%, by weight, of the abrasive particles have an initial particle size of at least 3 micrometers.

According to still further features in the described preferred embodiments, a specific lapping time [$t_{lap(specific)}$] to produce the lapped product is defined by a lapping time ($t_{lap}$) to produce the lapped product divided by a fraction (F) of the multiple-phase working surface that undergoes the lapping at any given moment, and $t_{lap(specific)}$ is less than 60 seconds, preferably less than 40 seconds, and more preferably, less than 20 seconds.

According to still further features in the described preferred embodiments, the lapping of the multiple-phase working surface is an initial lapping stage, and wherein prior to the initial lapping stage, the multiple-phase working surface has a surface roughness ($R_a$) of at least 0.25, and after the initial lapping procedure, a surface roughness ($R_a$) of the continuous phase is reduced below 0.05.

According to still further features in the described preferred embodiments, the lapping is effected to incorporate pieces of the plurality of particles into the continuous phase, wherein the pieces incorporated into the continuous phase have a population density of at least 10,000 particles per square millimeter.

According to still further features in the described preferred embodiments, this plurality of particles have a Mohs hardness of at least 7.5.

According to still further features in the described preferred embodiments, the surface of the plurality of particles is at least partially covered with an anti-microbial solid.

According to still further features in the described preferred embodiments, the surface of the plurality of particles is at least partially covered with a solid catalyst.

According to still further features in the described preferred embodiments, the surface of the plurality of particles is at least partially coated with a photovoltaic solid such as silicon or gallium arsenide.

According to still further features in the described preferred embodiments, the plurality of inorganic particles are incorporated in the continuous phase, and the inorganic particles have a Mohs hardness of at least 8 and a population density of at least 10,000 particles per square millimeter.

According to still further features in the described preferred embodiments, the workpiece and the multiple-phase working surface satisfy a relationship:

$$A_{s(soft)} = K \cdot V_{s(soft)},$$

wherein:
$A_{s(soft)}$ is a specific nominal surface area of the second solid phase on the working surface;
K is a coefficient;
$V_{s(soft)}$ is a volume fraction of the second solid phase, defined by:

$$V_{s(soft)} = W_{s(soft)} / \rho_{s(soft)},$$

wherein:
$\rho_{s(soft)}$ is a density of the second phase, in grams per cubic centimeter;
$W_{s(soft)}$ is a weight of the second phase per unit volume of the workpiece, in grams per cubic centimeter of the workpiece;
and wherein the coefficient K is at least 0.6.

According to still further features in the described preferred embodiments, the coefficient K is preferably at least 0.7, and more preferably, at least 0.8. In some cases, the coefficient K may be at least 0.9, up to substantially 1.0.

According to still further features in the described preferred embodiments, the workpiece and the multiple-phase working surface satisfying a relationship:

$$K_{l(soft)} = S_{exposed} / S_{max}$$

wherein:
$S_{exposed}$ is an exposed nominal surface area of a particular particle of a plurality of particles of the second solid phase on the multiple-phase working surface, and
$S_{max}$ is a maximum nominal cross-sectional area of the particular particle, for cross-sections that are nominally parallel to the multiple-phase working surface,
$K_{l(soft)}$ is a ratio of $S_{exposed}$ to $S_{max}$,
and wherein, for at least 50% of the plurality of particles of the second solid phase the ratio is at least equal to 0.8.

According to still further features in the described preferred embodiments, the surface of the plurality of particles is at least partially coated with an organic polymer.

According to still further features in the described preferred embodiments, the continuous phase has a hardness exceeding a hardness of the second phase by a Mohs Hardness of at least 1.0 2.5 3.5

According to still further features in the described preferred embodiments, the continuous phase is predominantly a metal.

According to still further features in the described preferred embodiments, the continuous phase has a Mohs Hardness of at least 2.5, at least 3.5, at least 4.5.

According to still further features in the described preferred embodiments, the Mohs Hardness of abrasive particles may be in the range of 7.5 to 9.0.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 3A is a schematic, top view of an exemplary particle of the soft phase of the workpiece, after conventional lapping with cast iron or aluminum;

FIG. 4A is a schematic, top view of an exemplary particle of the soft phase of the workpiece, after undergoing one embodiment of the lapping process of the present invention;

DESCRIPTION OF THE PREFERRED EMBODIMENTS

Figure 1:
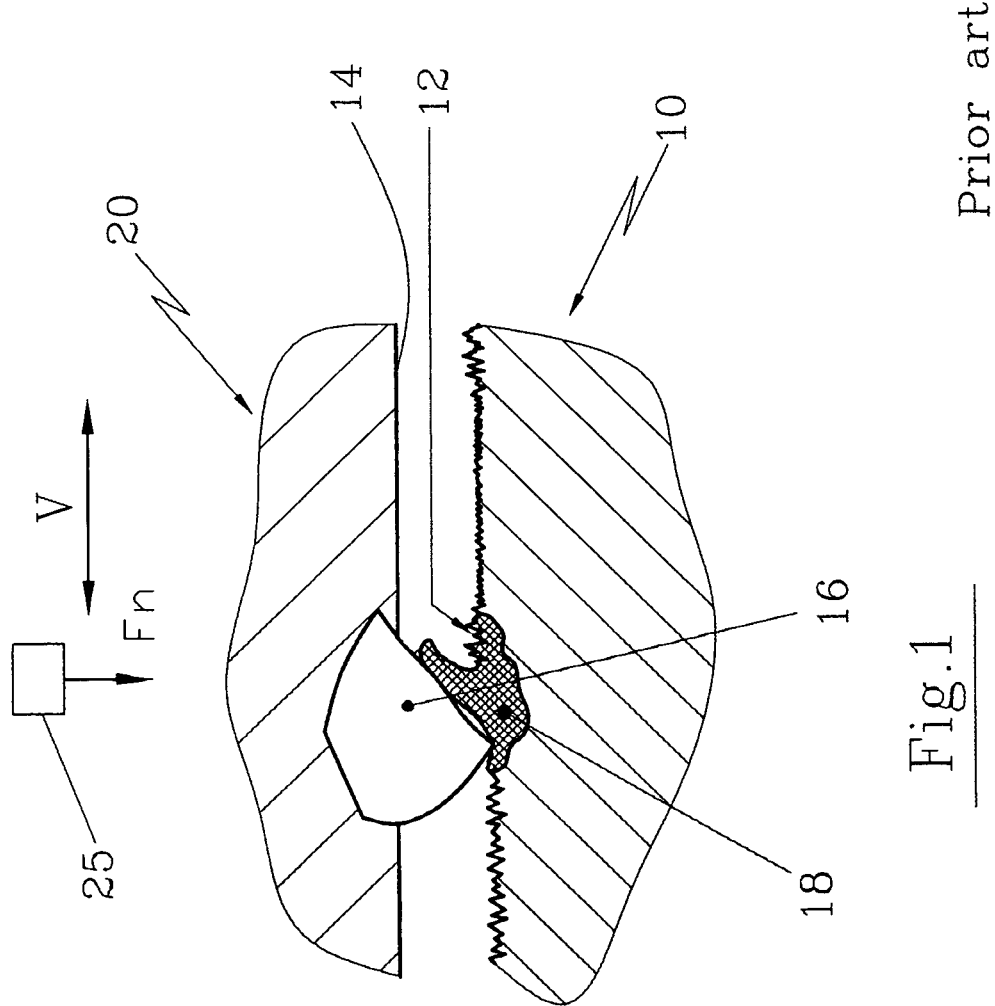
FIG. 1 is a schematic, largely cross-sectional view of a prior-art lapping arrangement, used for conditioning a metal tribological working surface.

The principles and operation of the present invention may be better understood with reference to the drawings and the accompanying description. Throughout the drawings, like-referenced characters are used to designate like elements.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

FIG. 1 schematically presents a lapping technology of the prior art, used for conditioning a metal tribological working surface 12. Working surface 12, disposed on a workpiece 10, faces a contact surface 14 of a lapping tool 20 and is separated by a nominal distance therefrom.

Abrasive particles such as abrasive particle 16 are disposed within a paste or slurry situated between contact surface 14 and working surface 12. Working surface 12 and contact surface 14 are made to move in a relative motion by a mechanism 25. This relative motion has a velocity of instantaneous magnitude V. Mechanism 25 also exerts a load $F_N$ (or a pressure) that is preferably substantially normal to contact surface 14 and working surface 12.

Those skilled in the art will appreciate that mechanism 25 may be chosen from various known and commercially available mechanisms for use in conjunction with lapping systems.

Under load $F_N$, abrasive particles such as abrasive particle 16 are partially embedded in contact surface 14, and to a lesser extent, in working surface 12. At relative velocity V, and under load $F_N$, abrasive particles such as abrasive particle 16 lap working surface 12, gouging out material therefrom, so as to effect the desired reduced roughness of working surface 12. As material is gouged out, a plastic deformation zone 18 is formed on working surface 12.

In conventional processes for lapping metals, contact surface 14 is made of a material having a hardness that is lower than the hardness of working surface 12, and/or has a hardness that is at least the hardness of aluminum.

Figure 2:
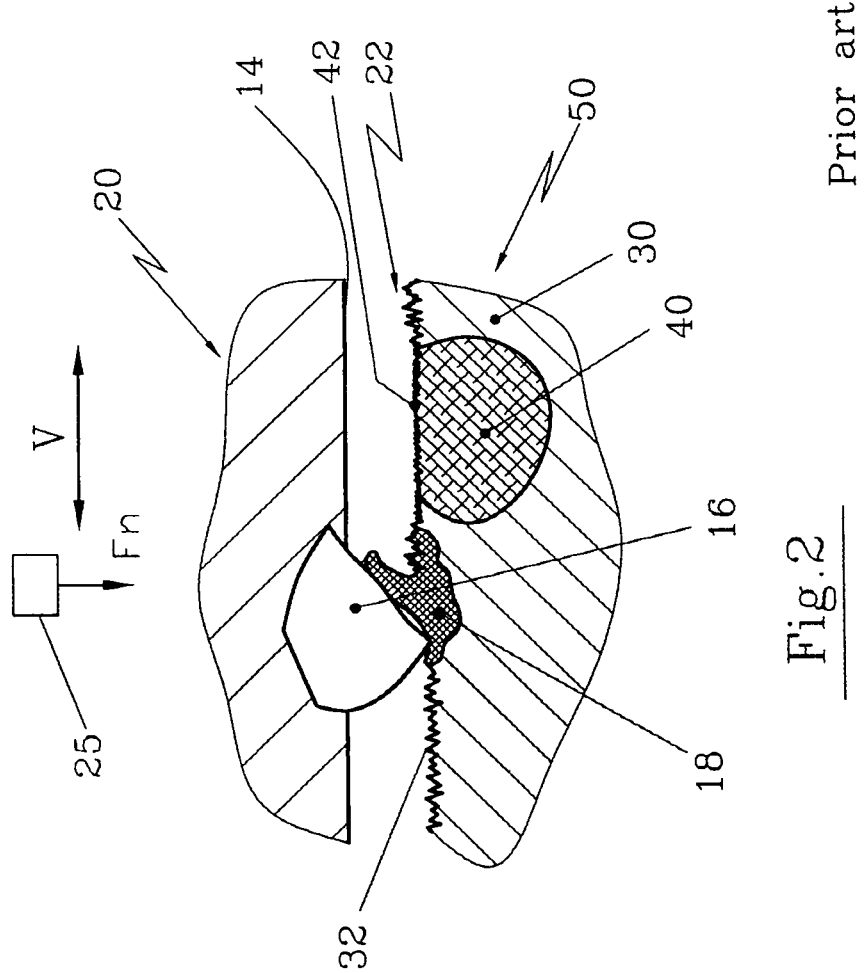
FIG. 2 is a schematic, largely cross-sectional view of the lapping arrangement of FIG. 1, used to condition a multiple-phase or composite working surface having phases of varying degree of hardness.

FIG. 2 schematically presents the prior art lapping technology of FIG. 1, used for conditioning a multiple-phase or composite tribological working surface 22 having phases of varying degree of hardness, by way of example, a relatively hard phase 30 and a relatively soft phase 40. Soft phase 40 may be present in various shapes, e.g., in the form of spheres, spheroids, lamellae or flakes, strips, streaks, etc.

Multiple-phase tribological working surface 22 may be a heterogeneous alloy, and may have a microstructure having more than one constituent. In the case of cast iron, hard phase 30 generally is a predominant phase that typically includes iron (ferrite) and soft phase 40 includes graphite enclosures. These graphite enclosures may be present as flakes or as streaks, or may be generally spheroidal. The spheroidal shape is characteristic of ductile or nodular cast irons in which trace amounts of magnesium are present in the melt.

Multiple-phase working surface 22, disposed on a multiple-phase workpiece such as a multiple-phase tribological workpiece 50, faces contact surface 14 of lapping tool 20 and is separated by a nominal distance therefrom. Mechanism 25 effects a relative velocity V between contact surface 14 and multiple-phase working surface 22, and applies a load $F_N$ that is substantially normal to these surfaces. Under these conditions, a corner of an abrasive particle such as abrasive particle 16 digs into working surface 22 and turns, producing a recess in working surface 22. As material is gouged out, a plastic deformation zone 18 is formed on working surface 22. The overall effect of mechanism 25 is to reduce the surface roughness of working surface 22.

Without wishing to be limited by theory, the inventors believe that because soft phase 40 is soft with respect to phase 30, the deformation forces exerted by the abrasive particles exert pressure near an exposed surface 42 of soft phase 40. Soft phase 40 yields to this pressure, causing exposed surface 42 to be at least partially covered by plastic deformation zone 18, as shown in the schematic, cross-sectional view provided in FIG. 3. Plastic deformation zone 18 is actually a part of exposed surface 32 of hard phase 30.

Thus, a treated working surface 24, produced from working surface 22 by the conventional lapping treatment, has a significantly reduced area of soft phase 40 with respect to the average area of soft phase 40 in the bulk of multiple-phase tribological workpiece 50. Such a reduced area may compromise the tribological properties of working surface 24, and deleteriously affect tribological performance. In the case of cast iron, the presence of graphite on the surface of the workpiece is known to aid lubrication on wearing surfaces, even under borderline lubrication conditions. The reduced area of the graphite on the working surface, with respect to the average area of the graphite in the bulk of the cast iron workpiece, reduces the tribological performance of the working surface.

Figure 4:
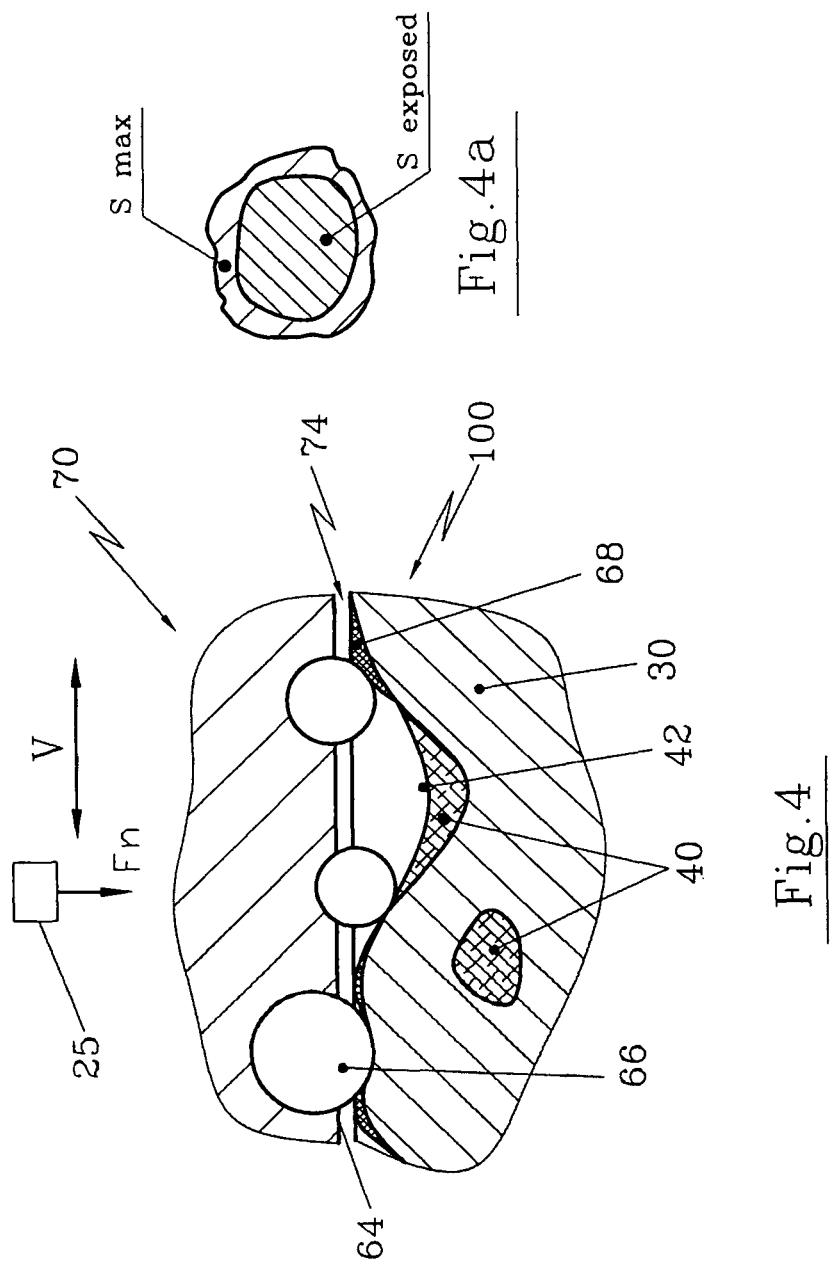
FIG. 4 provides a schematic, largely cross-sectional view of a lapping arrangement used to produce an inventive, treated multiple-phase tribological working surface.

Referring now to FIG. 4, a conventional lapping mechanism such as lapping mechanism 25 may be used in accordance with a lapping system 100 of the present invention. Shown in the schematic, cross-sectional view is a contact surface 64 of a lapping tool 70, in the process of lapping a multiple-phase tribological workpiece 100, to produce a treated multiple-phase working surface such as multiple-phase tribological working surface 74. Contact surface 64 is an organic, polymeric surface, or preferably includes an organic, polymeric material in the surface.

Multiple-phase working surface 74 contains at least two distinct phases having a characteristically distinct degree of hardness, by way of example, relatively hard phase 30 and relatively soft phase 40, as described hereinabove. Hard phase 30 is a substantially continuous phase, or preferably at least a predominant phase, having exposed surface 32. Soft phase 40 may be present in working surface 74 largely as a plurality of particles embedded or at least partially embedded in hard phase 30.

Thus, by way of example, hard phase 30 of working surface 74 may be cast iron, having a Mohs hardness of about 6-8 (and a Vickers hardness HV of 180-250 kgf/mm$^2$) and soft phase 40 may include graphite particles, having a Mohs hardness of about 1-2. The particles of soft phase 40 are typical of graphite spheroids or nodules in a cast-iron workpiece.

Typically, the difference in hardness between relatively hard phase 30 and relatively soft phase 40 is at least 0.5 on the Mohs hardness scale, and more typically, at least 1.5 on the Mohs hardness scale. In the case of cast-iron surfaces, the hardness differential may be about 4 to about 7.

Abrasive particles 66 are disposed within a paste or slurry situated between contact surface 64 and multiple-phase working surface 74. Multiple-phase tribological working surface 74 faces contact surface 64, and is typically separated by a nominal distance therefrom.

Mechanism 25 effects a relative velocity of instantaneous magnitude V between contact surface 64 and working surface 74, and applies a load $F_N$ that is preferably substantially normal to these surfaces. Those skilled in the art will appreciate that mechanism 25 may be chosen from various known and commercially available mechanisms for use in conjunction with lapping systems.

Under load $F_N$, abrasive particles 66 become partially embedded in contact surface 64, and to a much lesser extent, in working surface 74. At relative velocity V, and under load $F_N$, abrasive particles 66 lap working surface 74, gouging out material therefrom, so as to effect the conditioning of working surface 74. As material is gouged out, a plastic deformation zone 68 is formed on working surface 74.

It must be emphasized that when the lapping process is initiated, abrasive particles 66 may look substantially like abrasive particle 16 shown in FIG. 2. However, the elasticity of contact surface 64 results in less internal strains within the abrasive particles, with respect to the conventional lapping technologies, such that typical particles, such as abrasive particles 66, do not shatter. Rather, the particles lose some of their sharp edges in the course of rotating against working surface 74, and gradually become rounded. Consequently, gouges made in working surface 74 are characteristically much more shallow than those made in working surfaces lapped by conventional lapping technologies using cast iron or aluminum contact surfaces.

Figure 3:
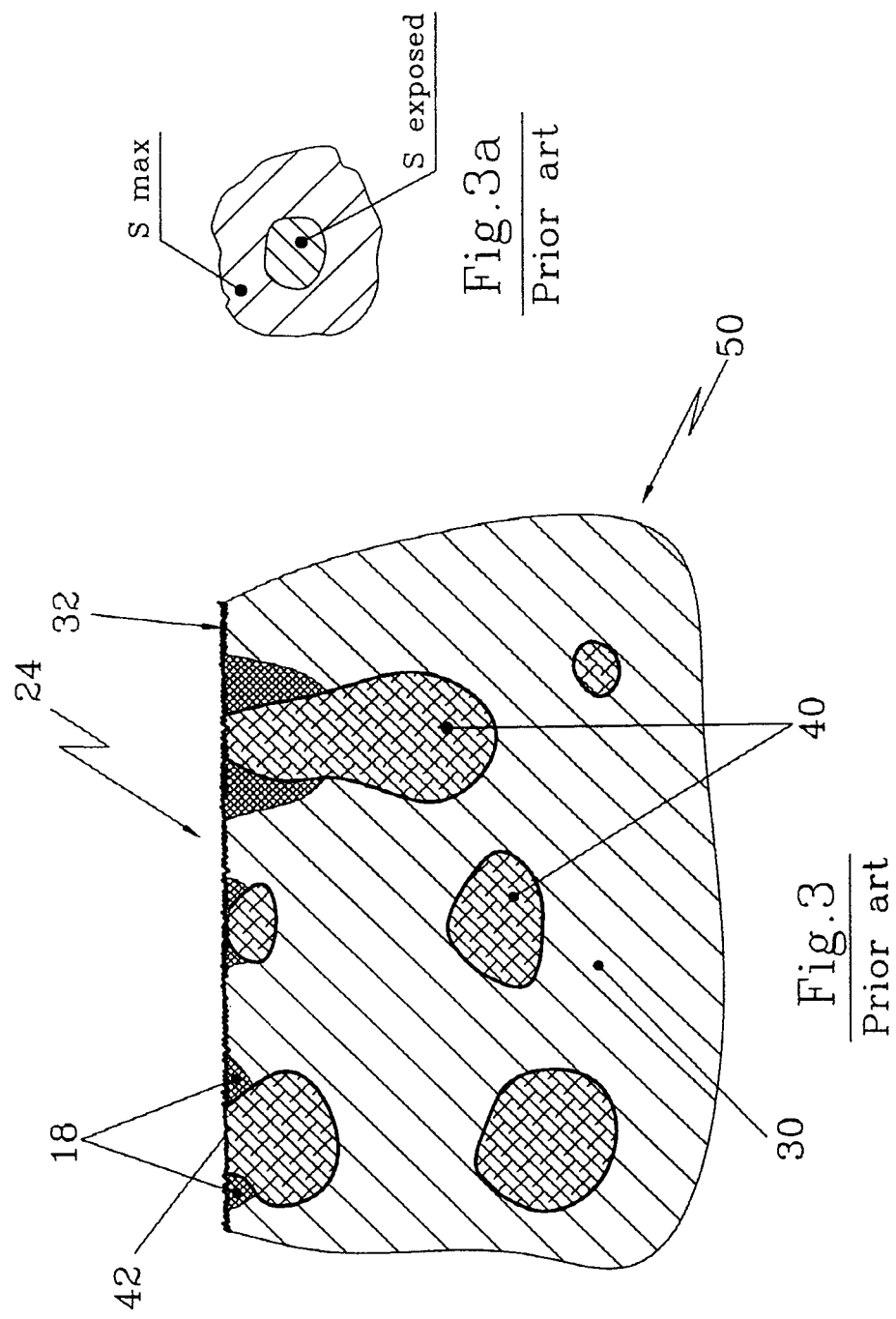
FIG. 3 is a schematic, cross-sectional view of a multiple-phase or composite workpiece lapped according to the lapping arrangement of FIG. 2.

After abrasive particles 66 have been rounded, substantially no additional stock is removed from working surface 74. Instead, the rotation of particles 66 under load $F_N$ effects a plastic deformation 68 on and in working surface 74. Plastic deformation zone 68 is characteristically different than the plastic deformation zones formed in conventional lapping processes (see FIG. 2, by way of example). Whereas in conventional lapping processes, the exposed surface of the soft phase or component becomes at least partially covered by the plastic deformation zone (as shown in FIG. 3), the deformation forces exerted by the abrasive particles in the lapping technology of the present invention are appreciably reduced, due to the elasticity of contact surface 64 and the rounded surfaces of abrasive particles 66. Consequently, mechanically weak soft phase 40 is subjected to moderate forces (relative to the deformation forces exerted by the abrasive particles in the conventional lapping technologies described hereinabove), from the action of abrasive particles 66 on plastic deformation zone 68.

The appearance of multiple-phase tribological working surface 74, treated in accordance with the present invention, may be appreciably different from that of multiple-phase tribological working surfaces produced in conventional metal-lapping processes. One manifestly evident difference relates to the amount of soft phase 40 exposed at the surface relative to the amount of soft phase 40 in the bulk of the multiple-phase material.

This difference will be particularly apparent from the microscopy images provided in the figures. With reference now to those figures, FIG. 5 is a scanning electron microscope (SEM) image showing a magnified view (400×) of a gray cast iron surface containing generally vein-shaped graphite enclosures, after the surface has been lapped in a conventional manner using an alumina paste in which the particles have passed through a 600 mesh sieve, and have a characteristic diameter of about 5-10 microns, and a cast-iron contact surface.

The general field consists substantially of the hard, ferrite phase, which is visibly gouged and scoured by the action of the abrasive particles during lapping. The recesses formed by this action tend to be generally linear, and have widths in a range of up to about 15 microns. The graphite veins have a typical length of about 20 to 120 microns. Some of the veins appear to be discontinuous.

Figure 5:
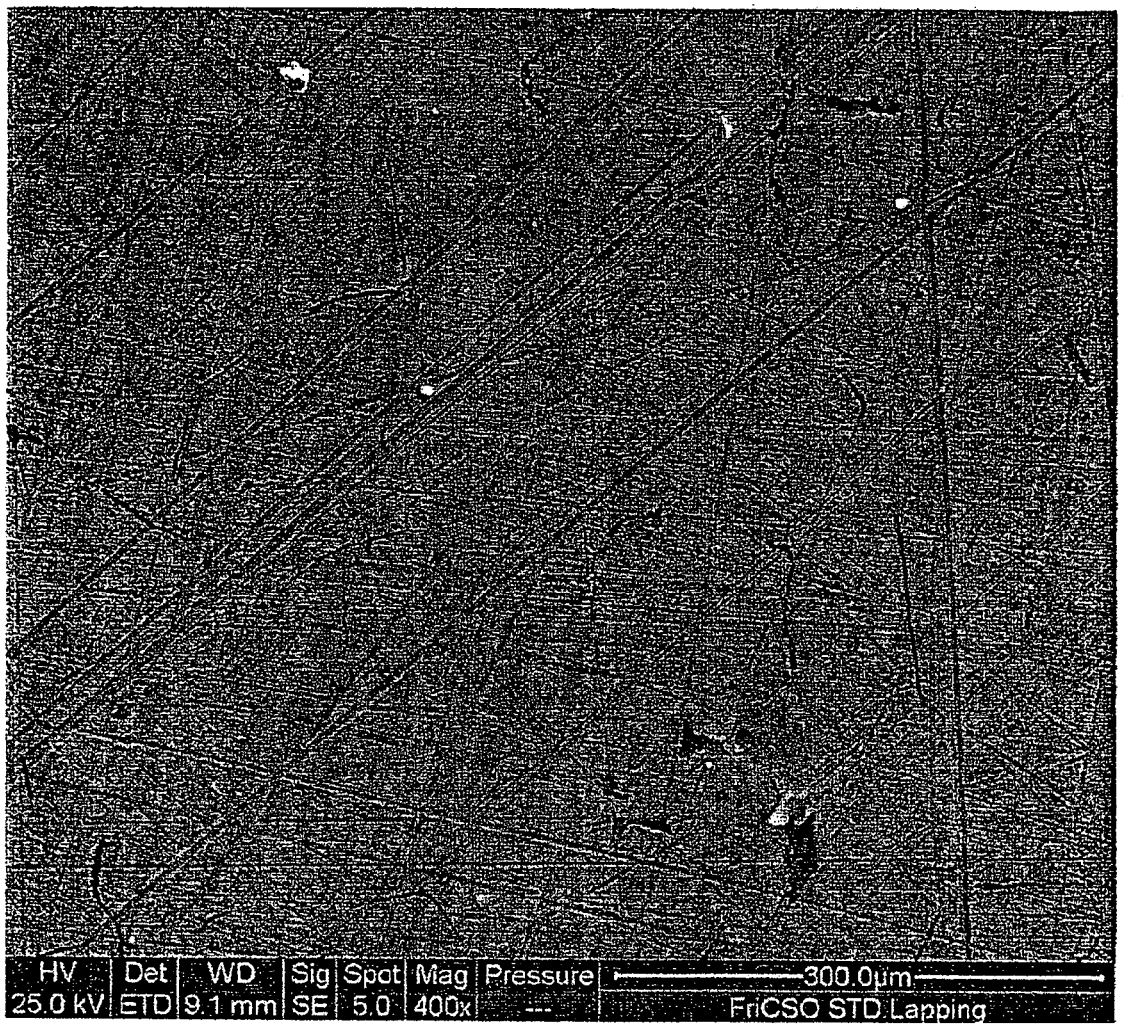
FIG. 5 provides a scanning electron microscope (SEM) image showing a magnified view (400×) of a gray cast iron surface containing generally vein-shaped graphite enclosures, after the surface has been lapped with a cast-iron contact surface.
Figure 6:
FIG. 6 provides a SEM image of the gray cast iron surface of FIG. 5, at higher magnification (1500×)

FIG. 6 is a scanning electron microscope (SEM) image of the gray cast iron surface of FIG. 5, at higher magnification (1500×). A major recess angling up towards the top right corner of the field has a width of close to 5 microns. The path made by this recess appears to have covered up a portion of at least one graphite vein disposed near the center of the field.

Figure 7:
FIG. 7 is a SEM image of the gray cast iron surface of FIG. 5, at still higher magnification (6000×), showing an extremely wide graphite vein.

FIG. 7 is a scanning electron microscope (SEM) image of the gray cast iron surface of FIG. 5, at still higher magnification (6000×), showing an extremely wide graphite vein having a width of about 8-10 microns. It appears that material, possibly ferritic material, is encroaching on parts of this graphite vein, and that the vein has been partially covered or loosely filled with debris.

Figure 8:
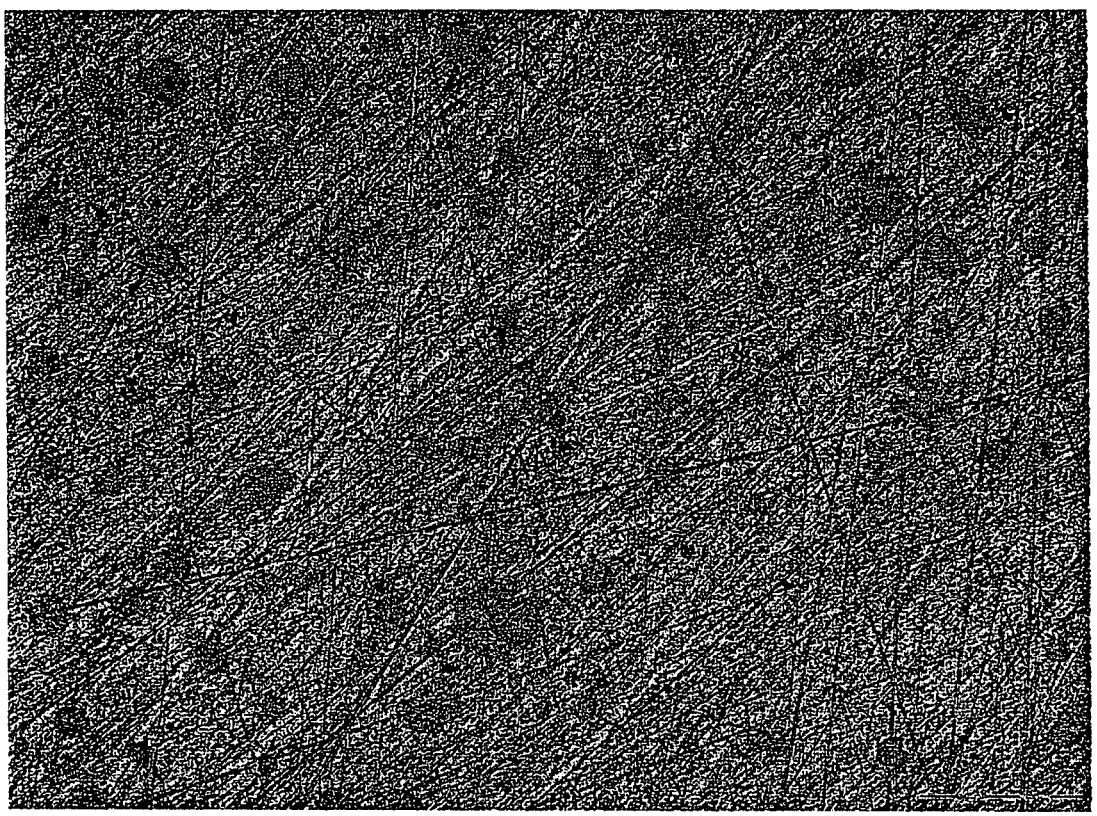
FIG. 8 is an optical image showing a magnified view (100×) of a gray cast iron surface containing nodular, generally spheroidal graphite enclosures, and lapped in a conventional manner using a cast-iron contact surface.

FIG. 8 is an optical image showing a magnified view (100×) of a gray cast iron surface lapped in a conventional manner using an alumina paste in which the particles have passed through a 600 mesh sieve, and have a characteristic diameter of about 5-15 microns, and a cast-iron contact surface, the surface containing nodular, generally spheroidal graphite enclosures. The general field consists substantially of the hard, ferrite phase, which is visibly gouged and scoured by the action of the abrasive particles during lapping. The recesses formed by this action tend to be generally linear.

The spheroidal carbon enclosures generally have a diameter of 10-100 microns, and more typically, about 30-40 microns.

Figure 9:
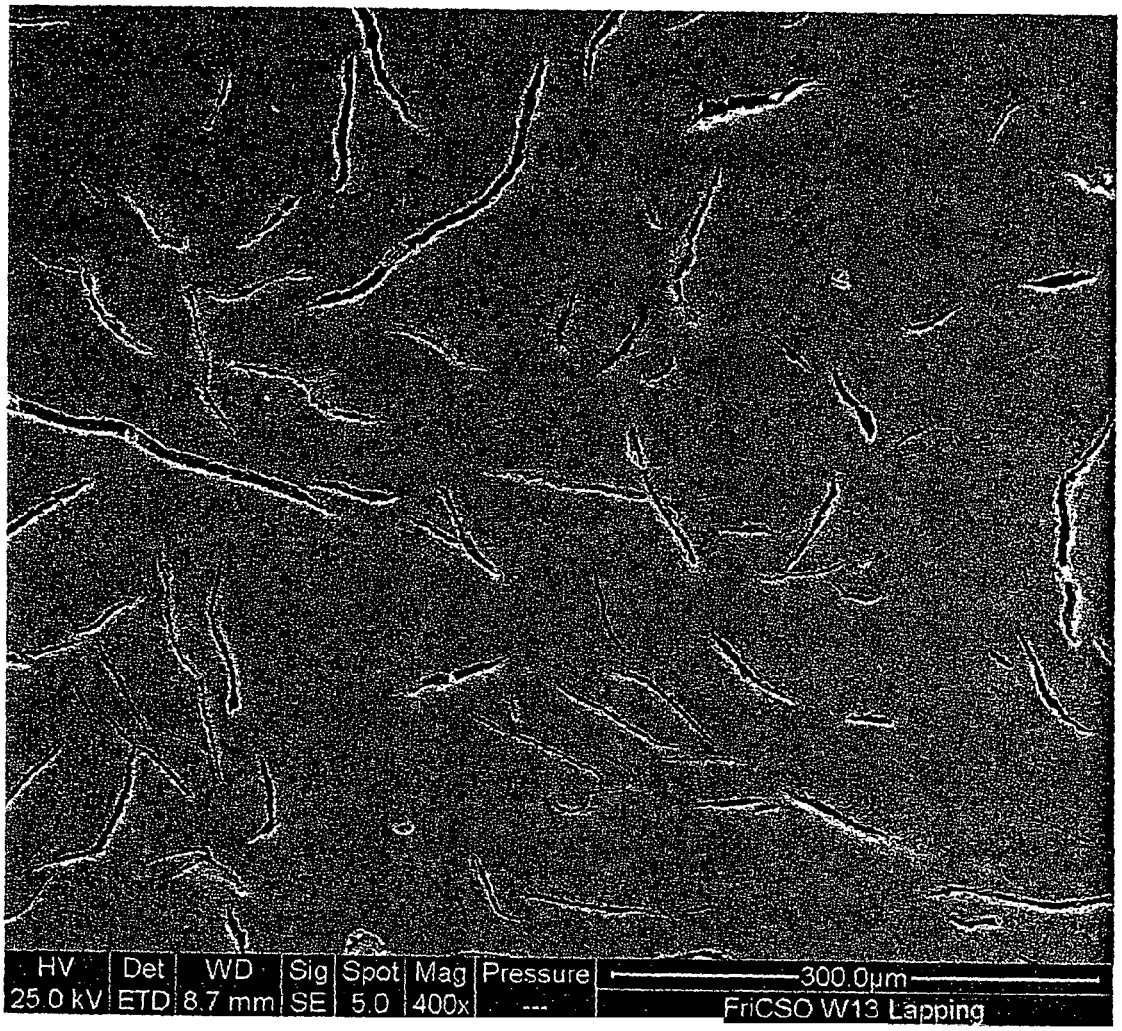
FIG. 9 is a SEM image showing a magnified view (400×) of an inventive gray cast iron surface containing generally vein-shaped graphite enclosures.

FIG. 9 is a scanning electron microscope (SEM) image showing a magnified view (400×) of an inventive gray cast iron surface containing generally vein-shaped graphite enclosures. The surface has been lapped using an alumina paste in which the particles have passed through a 600 mesh sieve, and have a characteristic diameter of about 5-15 micrometers, and an organic, polymeric contact surface having a Shore D hardness of about 76, in accordance with the present invention.

Figure 10:
FIG. 10 is a SEM image of the inventive gray cast iron surface of FIG. 9, at higher magnification (1600×)
Figure 11:
FIG. 11 is a SEM image of the inventive gray cast iron surface of FIG. 9, at still higher magnification (6000×)

FIG. 10 is a SEM image of the inventive gray cast iron surface of FIG. 9, at higher magnification (1600×). FIG. 11 is a SEM image of the inventive gray cast iron surface of FIG. 9, at still higher magnification (6000×).

In comparison to the SEM image of identical magnification provided in FIG. 5, the general field of FIG. 9, which consists substantially of the hard, ferritic phase, is extremely smooth. Even in FIG. 10, taken at a magnification of 1600×, there appear only gentle hints of the scouring lines from the abrasive particles.

In both FIG. 9 and FIG. 10, the vein-shaped graphite enclosures are wider and more numerous, and perhaps most significantly, take up a much higher proportion of the nominal surface area. In FIG. 11, taken at a magnification of 6000×, the graphite vein is distinctly continuous, and devoid of debris. The borders of the vein are well defined.

Figure 12:
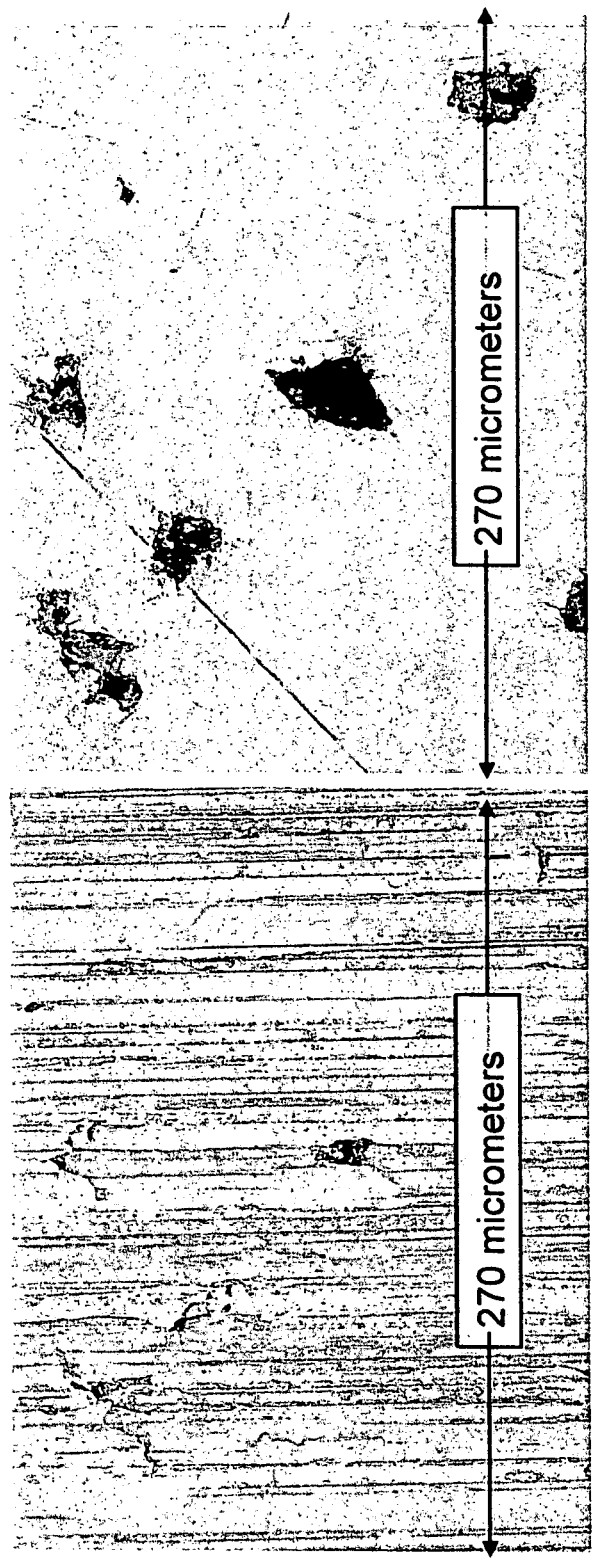
FIG. 12A is an optical image showing a magnified view (~500×) of a gray cast iron surface containing nodular, generally spheroidal graphite enclosures, after grinding.
FIG. 12B is an optical image showing a magnified view (~500×) of the surface of the workpiece of FIG. 12A, after lapping according to the method of the present invention.

FIG. 12A is an optical microscope image showing a magnified view (~500×) of a cast-iron specimen that has undergone a conventional grinding operation.

FIG. 12B is an optical microscope image showing a magnified view (~500×) of the surface of the specimen shown in FIG. 12A, after being lapped in accordance with the present invention. Lapping was performed using an alumina paste in which the particles passed through a 600 mesh sieve, and have a characteristic diameter of about 5-15 micrometers. The lapped cast-iron surface contains nodular, generally spheroidal graphite enclosures.

The general field consists substantially of the hard, ferritic phase. There are fewer scour lines, with respect to the prior art surface shown in FIG. 8, and the graphite spheroids are much more pronounced by the action of the abrasive particles during lapping. The recesses formed by this action tend to be generally linear.

The spheroidal carbon enclosures generally have a diameter of 20-40 micrometers, and in some cases, the diameter may reach about 120 micrometers. The spheroidal carbon enclosures also take up a higher proportion of the nominal surface area, with respect to identical specimens treated using conventional cast-iron lapping processes.

Thus, whereas conventionally treated working surface 24 (shown in FIG. 3) has a significantly reduced area of soft phase 40 with respect to the average area of soft phase 40 in the bulk of multiple-phase tribological workpiece 50, the relative nominal surface area of exposed surface 42 (shown in FIG. 4) of soft phase 40 in inventive working surface 74 may be characteristically similar to the average relative area of soft phase 40 in the bulk of multiple-phase tribological workpiece 50.

In characterizing the disposition of exposed surface 42 of soft phase 40 on working surface 74, we define the following relationships:

$$V_{s(soft)} = W_{s(soft)}/\rho_{s(soft)} \quad \text{(I)}$$

$$A_{s(soft)} = K \cdot V_{s(soft)} \quad \text{(II)}$$

wherein:

$A_{s(soft)}$ is the specific nominal surface area of the soft phase on the treated working surface 74, after lapping and prior to use;

$V_{s(soft)}$ is the volume fraction of the soft phase, i.e., volume of the soft phase per unit volume of the multiple-phase workpiece;

$W_{s(soft)}$ is the weight of the soft phase per unit volume of multiple-phase workpiece, in grams per cubic centimeter (of the workpiece);

$\rho_{s(soft)}$ is the density of the soft phase, in grams per cubic centimeter;

K is a coefficient that may be inversely correlated to the degree or magnitude of plastic deformation.

In the ideal case in which the deformation forces are substantially zero, the coefficient K may approach 1.0. In the present invention, in which the deformation forces are significantly reduced, yet finite, the coefficient K is preferably at least 0.6, more preferably, at least 0.7, and yet more preferably, at least 0.8. In some cases, the coefficient K may be at least 0.9, up to substantially 1.0.

The specific nominal area of the soft phase on the working surface is measured by means of an optical microscope or scanning electron microscope (SEM), using standard micrometry techniques.

In further characterizing the disposition of exposed surface 42 of soft phase 40 on working surface 74, we define the following relationship:

$$K_{I(soft)} = S_{exposed}/S_{max} \quad \text{(III)}$$

wherein:

$S_{exposed}$ is the exposed nominal surface area of a particular soft phase particle on treated working surface 74, after lapping and prior to use (e.g., tribological use), and $S_{max}$ is the maximum nominal cross-sectional area of that particular soft phase particle, for cross-sections that are nominally parallel to the exposed, treated working surface.

In prior art multiple-phase surfaces known to us, and more particularly, in cast-iron multiple-phase surfaces, we have found that less than 20% of the particles of soft phase 40 have an exposed nominal surface area that is at least equal to 0.8 times ($K_{I(soft)} \geq 0.8$) the maximum nominal surface area of the particle.

A schematic, top projection of an exemplary particle of the soft phase, after conventional lapping with cast iron or aluminum, is provided in FIG. 3A. The exposed surface area ($S_{exposed}$) of the soft particle is only a small fraction of the particle's maximum cross-sectional area ($S_{max}$), which is generally disposed well below the exposed surface.

By sharp contrast, in multiple-phase surfaces of the present invention, and more particularly, in cast-iron multiple-phase surfaces of the present invention, we have found that more than 50% of the particles of soft phase 40 have an exposed nominal surface area that is at least equal to 0.8 times the maximum nominal cross-sectional area of the particle.

A schematic, top projection of an exemplary particle of the soft phase, after lapping with a polymeric surface according to the present invention, is provided in FIG. 4A. The exposed surface area ($S_{exposed}$) of the soft particle is a large fraction of the particle's maximum cross-sectional area ($S_{max}$). In many particles, such as partially-exposed particle 40 in FIG. 4, the exposed surface area is actually the particle's maximum cross-sectional area.

Without wishing to be limited by theory, it is possible that the exposure of soft-phase particles in such a fashion aids in the liberation of the soft-phase particles (e.g., graphite particles) during tribological activity, thereby contributing to lubrication between the workpiece surface and the countersurface moving under a load at some relative velocity.

Referring again to FIG. 4, conventional lapping processes on multiple-phase surfaces tend to produce plastic deformation zones having sharp corners, which is disadvantageous for various applications, including tribological applications.

We have surprisingly found that plastic deformation zone 68 of the present invention typically has no such sharp corners. Rather, the rounded abrasive particles such as abrasive particles 66, coupled with the elasticity of contact surface 64, enable the production of a smooth interface or rounded shoulder 72 between plastic deformation zone 68 and exposed surface 42 of soft phase 40. A typical radius of the rounded edge surrounding the pore or inclusion of soft phase 40 is 2-20 micrometers. Typically, in the continuous phase there is also a moderate slope down towards the pore of about 0.5 micrometers over 50 a length of micrometers.

The inventors have found that exposed surface 42 of soft phase 40 may often be disposed well below the general level of multiple-phase tribological working surface 74, such that pronounced dips may be observed in the exposed areas of soft phase 40.

Typically, the lapping process of the present invention may remove, on average, at least 1.5 or 2 micrometers from the thickness of soft phase 40. For graphite and various other included materials, the inventive lapping process may typically remove, on average, at least 3.5 micrometers, more typically 5 micrometers and in some cases, at least 8 micrometers and up to 20 micrometers or more.

Profile measurements were performed using a Mitutoyo SJ-400 surface roughness tester equipped with a 2.5 micrometer stylus. Travel speed was maintained at 0.5 mm/sec and the total travel length per measurement was 5 mm. Vertical magnification was ×20 and horizontal magnification was ×50. A similar procedure can be performed using Veeco Dektak profilers.

As used herein in the specification and in the claims section that follows, the recessing of the soft phase with respect to the continuous phase is measured using these, or other similar, suitable profiling machines.

Without wishing to be limited by theory, it is possible that the depression of soft-phase particles beneath the surface of continuous phase, and/or the rounding of the edges of the continuous phase surrounding the soft-phase particles, and/or the at least partial removal of the plastic deformation zone surrounding the soft-phase particles, reduce the tendency of shear stresses to break, crack, or otherwise damage the edge of the continuous phase.

In any event, it has been experimentally demonstrated that the inventive surfaces of the present invention exhibit both improved sustainability to wear and lower friction coefficients with respect to conventionally lapped surfaces.

We have found that the lapping process of the present invention is highly efficacious in reducing surface roughness. For a cast iron surface having an initial $R_a$ above 0.35, the continuous phase of the lapped surface has an $R_a$ of less than 0.07 micrometers, typically less than 0.05 micrometers, and often less than about 0.03 micrometers. For a cast iron surface having an initial $R_a$ of 0.20 to 0.35 micrometers, the continuous phase of the lapped surface has an $R_a$ of less than 0.05 micrometers, typically less than 0.04 micrometers, and often less than about 0.03 micrometers. Moreover, the reduced surface roughness may be achieved in a single lapping stage.

It must be further emphasized that the lapping process of the present invention may advantageously utilize high contact pressures, without creating excessively high local compression stresses in the workpiece surface.

The lapping process of the present invention may be characterized by short lapping times. We define a specific lapping time [$t_{lap(specific)}$] to produce the lapped surface as the lapping time ($t_{lap}$) to produce the lapped product divided by a fraction (F) of the multiple-phase working surface that undergoes lapping at any given moment. We have found, using cast iron having an initial $R_a$ of 0.25 to 0.6 micrometers, the continuous phase of the lapped surface may have an $R_a$ of less than 0.07 micrometers, typically less than 0.05 micrometers, and often less than about 0.03 micrometers, wherein the specific lapping time is less than 90 seconds, preferably less than 60 seconds, and more preferably, less than 40 seconds, and most preferably, less than 20 seconds.

Figure 13:
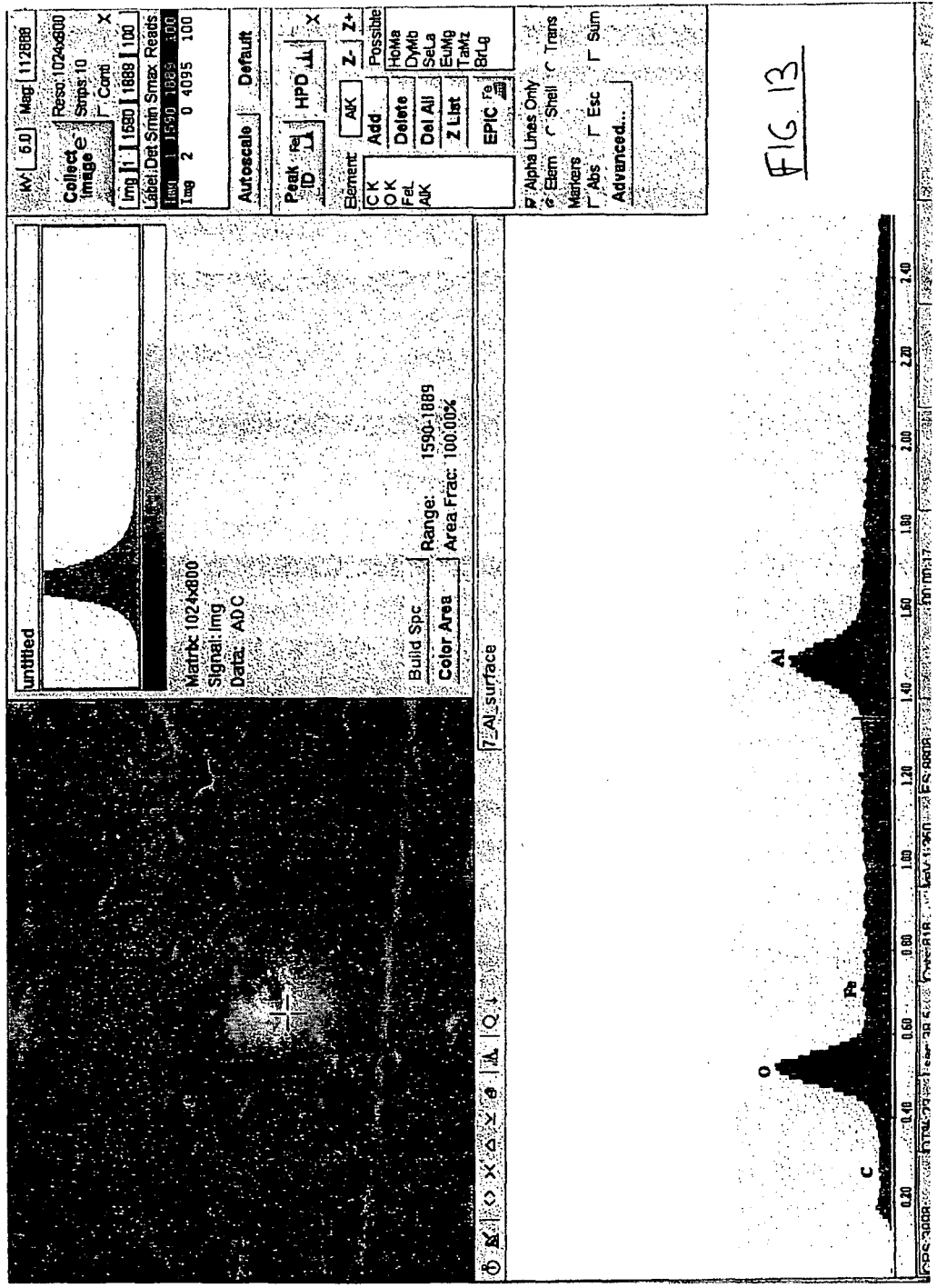
FIG. 13 is a SEM image of a cast-iron surface of the present invention, along with a corresponding Energy Dispersive Spectroscopy (EDAX) plot indicating the presence of alumina at a particular location on the cast-iron surface.

FIG. 13 is a SEM image of a cast-iron surface of the present invention, along with a corresponding Energy Dispersive Spectroscopy (EDAX) plot showing a chemical analysis at a particular location on the cast-iron surface. The large peaks of aluminum and oxide indicate the presence of alumina on the cast-iron surface. Naturally, the presence of iron and some carbon is also detected.

Surprisingly, we have found that the alumina particles are integrally incorporated into the cast-iron surface. After lapping, the inventive working surfaces may be subjected to a rigorous cleaning process to remove loose particulate matter and organic debris.

Example 1

A cast-iron sample weighing 100 grams contains 4% (4 grams) graphite and 96% (96 grams) ferrite+silicon. The density of the soft, graphite phase is about 2.33 g/cm$^3$; the density of the hard, ferrite+silicon phase is about 7.7 g/cm$^3$. Thus, the total volume of the sample is about 14.19 cm$^3$.

From equation (I), the volume fraction of the soft phase is about 0.12 (i.e., 0.12 cm$^3$ of soft phase per cm$^3$ of sample). Hence, for a coefficient K of about 0.8, the specific nominal surface area of the graphite on treated working surface 74 (after lapping and prior to tribological use) is given by equation (II): $A_{s(soft)} = K \cdot V_{s(soft)} = 0.8 \cdot 0.12 = 0.096$ (cm$^2$ of nominal surface area of the graphite per nominal cm$^2$ of the treated working surface); for a specific nominal surface area of graphite of 0.102, the coefficient K is about 0.85.

As used herein in the specification, the term "cleaning", "cleaned", or "cleaning process", with respect to a working surface, refers to the following procedure:
  (step 1) immersion of the working surface in a bath filled with isopropanol or ethanol, and subjecting the immersed working surface to ultrasonic treatment for at least one minute;
  (step 2) washing in ethanol followed by wiping the surface with a cloth soaked in ethanol, and
  (step 3) subjection to a vacuum of 10-7 torr (preferably up to 10-10 ton) for at least 5 minutes,
wherein the specific parameters of the ultrasonic treatment, the washing in ethanol, and the wiping are performed so as to remove loose particulate matter and organic debris, according to techniques that are known to one skilled in the art.

It must be emphasized that over the course of extensive testing of lapped and cleaned working surfaces using conventional lapping tool surfaces (cast iron, aluminum), substantially no alumina particles were detected in the hard phase of any of the working surfaces.

By sharp contrast, lapped and cleaned working surfaces produced using the inventive polymeric lapping tool surface and a conventional abrasive paste (such as an abrasive paste containing alumina particles in an organic medium) have a population density of at least 2,000 alumina particles per square millimeter, typically, at least 10,000 alumina particles per square millimeter, more typically, at least 50,000 alumina particles per square millimeter, yet more typically, at least 100,000 alumina particles per square millimeter, and most typically, 300,000-600,000 particles per square millimeter.

In terms of coverage area, the coverage area of the incorporated alumina particles is at least 0.1% of the nominal surface area of the working surface, typically, at least 0.5%, and more typically, at least 2%. Various working surfaces of the present invention were found to have coverage areas in the range of 3% to 6%.

At least 90% of the alumina particles have a diameter of less than 1 micrometer (1000 nanometers). In many cases, at least 90% of the abrasive particles have a diameter of less than 300 nanometers. In some cases, at least 50% of the abrasive particles have a diameter of less than 100 nanometers. The smallest particles measured to date have a diameter of no more than 10 nanometers.

Typically, the alumina used in the abrasive pastes used in the inventive lapping process is fused alumina. However, as used herein in the specification, the term "alumina" refers to all forms of alumina, including fused alumina, unfused alumina, alpha alumina, gamma alumina, and natural alumina or alumina-containing materials such as corundum and emery.

More generally, other pastes containing inorganic abrasives can be used in conjunction with the inventive lapping process and inventive contact surface to produce the inventive working surface. One common denominator of the incorporated inorganic abrasive particles is hardness: the hardness should be at least 8 on the Mohs scale. The presently preferred hardness is 8 to 9.5, inclusive. Thus, in addition to different forms of alumina, garnet, corundum, silicon carbide, and boron carbide are suitable, or appear to be suitable for incorporation into working surfaces, to produce the working surfaces of the present invention. Also, the above-delineated characterizations of population density, coverage area, and particle size with respect to alumina incorporated on the working surface, may be broadly applicable to other such inorganic abrasives.

With regard to lapping tool 70 and contact surface 64, contact surface 64 contains, or is made of, an organic or polymeric material having a hardness that is substantially lower than the hardness of hard phase 30 of working surface 74. Contact surface 64 may be a layer that is mechanically supported (e.g., on a rigid backing such as a metal or plastic backing). Contact surface 64 may have a thickness of at least 0.1 mm and preferably, at least 0.5 mm. Alternatively, lapping tool 70 may be made of a single, integral piece of polymeric material.

With regard to the composition of contact surface 64 of tool 70, we have found that polyurethane is suitable for forming the organic, polymeric contact surface of the tool. Preferably, a mixture of epoxy cement and polyurethane in a ratio of about 25:75 to 90:10, by weight, is suitable for forming the elastic, organic, polymeric contact surface of the lapping tool. In the epoxy cement/polyurethane mixture, the epoxy provides the hardness, whereas the polyurethane provides the requisite elasticity and wear-resistance. We have further found that the polymeric contact surface of the tool may contribute to the deposition of an organic, possibly polymeric nanolayer on at least a portion of the working surface.

Regarding the inventive lapping process for finishing multiple-phase working surface 74 such as cast-iron containing graphite enclosures, the weight ratio of epoxy cement to polyurethane in the contact surface preferably ranges from about 1:2 to about 2:1, and more preferably, from about 3:5 to about 7:5.

In terms of absolute composition, by weight, the lapping tool surface typically contains at least 10% polyurethane, preferably, between 20% and 75% polyurethane, more preferably, between 40% and 75% polyurethane, and most preferably, between 40% (inclusive) and 65% (inclusive).

The inventive contact surface of the lapping tool preferably contains, by weight, at least 10% epoxy, more preferably, at least 35% epoxy, yet more preferably, at least 40% epoxy, and most preferably, between 40% (inclusive) and 70% (inclusive). In some applications, however, the elastic layer preferably contains, by weight, at least 60% epoxy, and in some cases, at least 80% epoxy.

Preferably, the contact surface of the lapping tool should have the following mechanical properties:
  Shore D hardness within a range of 40-90, preferably 60-90, more preferably 65-85, and most preferably, 70-80;
  Young's modulus of less than 20 gigapascals (GPa), preferably less than 7 GPa, more preferably less than 2 GPa, yet more preferably less than 1 GPa, and most preferably, less than 0.7 GPa.

These ranges apply especially to lapping of cast iron containing graphite enclosures.

We have found the Young's modulus to be of particular importance in effecting the special topographical properties in the workpiece surface, according to the technology of the present invention. Without wishing to be limited by theory, we believe that a suitably low Young's modulus is instrumental in enabling the contact surface to conform to the local topographies of the workpiece surface. Consequently, the effective contact area for lapping increases, appreciably improving the lapping efficiency. Moreover, considerable local stresses associated with rigid metallic lappers are eliminated or substantially reduced, leading to a reduction in plastic deformation over the lapped workpiece.

A low Young's modulus may also be instrumental in enabling extremely high pressures to be maintained substantially perpendicular to the workpiece and contact surfaces.

The pressure on the contact surface and the multiple-phase working surface is typically at least 0.5 megapascals (MPa). Preferably, the pressure is at least 0.1 MPa, and more preferably, at least 0.5 MPa. In cast-iron systems containing graphite enclosures, and in other multiple-phase systems as well, the pressure may be at least 1.0 MPa, at least 1.5 MPa, and in some cases, at least 1.8 MPa.

It will be appreciated by one skilled in the art, however, that the hardness of contact surface 64, and the Young's modulus and other mechanical properties thereof, may depend heavily on the mechanical properties of working surface 74, and in particular, on the absolute hardness, and relative hardness, of hard phase 30 and soft phase 40.

It may be of further advantage for the contact surface of the lapping tool to have an impact resistance (with notch) within a range of 3-20 kJ/m$^2$, preferably 3-12 kJ/m$^2$, more preferably 4-9 kJ/m$^2$, and most preferably, 5-8 kJ/m$^2$, according to ASTM STANDARD D 256-97.

It should be appreciated that a variety of materials or combinations of materials could be developed, by one skilled in the art, that would satisfy these physical and mechanical property requirements.

An exemplary lapping tool surface for use in accordance with the present invention is synthesized as follows: an epoxy resin, a polyol and a di-isocyanate are reacted at a temperature exceeding room temperature and less than about 150° C. Subsequently, a hardener is mixed in. As will be evident to one skilled in the art, the requisite curing conditions depend largely upon the particular qualities and ratios of the abovementioned ingredients. It will be further evident to one skilled in the art that the polymer can be produced as a bulk polymer or as a molded polymer.

It will be appreciated by one skilled in the art that the production of the epoxy cement/polyurethane mixture can be achieved using various known synthesis and production techniques.

While advantageous ratios of the epoxy and polyurethane materials have provided hereinabove and in the claims section hereinbelow, it should be appreciated that other polymers or combinations of polymers having the requisite mechanical and physical properties for use in conjunction with the inventive device and method could be developed by one skilled in the art.

With regard to the abrasive material freely disposed between working surface 74 and contact surface 64, the abrasive particles 66 disposed within the paste or slurry may include, or consist essentially of, alumina. It appears highly advantageous for abrasive particles 66 to be disposed in a high concentration between working surface 74 and contact surface 64. It further appears that abrasive particles 16 may include abrasive particles of any of various materials and compositions known to those skilled in the art, such as silicon carbide and diamond, depending on the hardness and other physical and mechanical properties of the untreated working surface.

We have further discovered the presence of organic, possibly polymeric material disposed on the inventive tribological surface. This material generally has a thickness of up to 30 nm. The source of the material is the inventive contact surface of the lapping tool, although it may be possible to achieve a similar result using materials disposed in the abrasive paste. The organic material is intimately bonded to the working surface and follows the nanometric contours of the working surface. Consequently, the organic material is not liberated during the cleaning process described hereinabove.

As used herein in the specification and in the claims section that follows, the term "predominant" or "predominantly", and the like, is used to indicate that within a group of elements, species, materials, or values, a particular element, species, material, or value in that group is present in a greater quantity or has a larger value than the other members of the group, but does not necessarily represent a majority.

As used herein in the specification, the term "nominal surface area" with regard to a working surface or a phase thereof, refers to a surface area of the surface based on the global geometric dimensions, irrespective of roughness. Hence, a square, 4 cm×4 cm working surface has a nominal surface area of 16 cm$^2$; a round nodule on the working surface having an exposed radius of 10 micrometers has a nominal surface area of about 78.5 square micrometers.

As used herein in the specification and in the claims section that follows, the term "Shore D hardness", and the like, refers to a measure of the resistance of material to indentation, according to the standard ASTM test (D 2240-97). The hardness testing of plastics and hard rubbers is most commonly measured by the Shore D test, with higher numbers signifying greater hardness.

As used herein in the specification and in the claims section that follows, the term "impact resistance" refers to the impact resistance, with notch, in units of kJ/m$^2$, as determined by ASTM STANDARD D 256-97.

As used herein in the specification and in the claims section that follows, the term "particle size" with respect to abrasive particles or other particulate matter, is measured using a laser diffraction particle-sizing system, e.g., a Mastersizer® 2000 particle size analyzer from Malvern Instruments Ltd. (Worcestershire, UK).

As used herein in the specification and in the claims section that follows, the term "lapping" is specifically meant to exclude surface conditioning processes using fixed abrasives on the contact surface, such as grinding stones, abrasive tapes, and soft abrasive wheels.

What is claimed is:

1. A lapping process for producing a modified multiple-phase working surface from a multiple-phase working surface, the process comprising the steps of:
   (a) providing a system including:
      (i) a workpiece having a multiple-phase working surface including:
         (A) a first continuous solid phase;
         (B) a second solid phase, intimately dispersed within said continuous phase in said multiple-phase working surface,
      said continuous phase having a hardness exceeding a hardness of said second phase by a Mohs Hardness of at least 0.5;
      (ii) a contact surface, disposed generally opposite said working surface, said contact surface having a Shore D hardness within a range of 40-90, and a Young's modulus of less than 20 gigapascals (GPa);
      (iii) a plurality of particles, including abrasive particles, said plurality of particles freely disposed between said contact surface and said working surface, and
   (b) lapping said multiple-phase working surface by exerting a pressure on said contact surface and said multiple-phase working surface, and applying a relative motion between said working surface and said contact surface, to effect an at least partially elastic interaction between said contact surface and said abrasive particles in which at least a portion of said abrasive particles penetrate said working surface, to produce a lapped product having the modified multiple-phase working surface, in which an exterior surface of said second phase is recessed by an average of at least 1.5 micrometers with respect to an exterior surface of said continuous phase,
   the workpiece having the multiple-phase working surface including at a time prior to initiation of the exerting of pressure on said multiple-phase working surface and on said contact surface.

2. The lapping process of claim 1, wherein said Young's modulus is less than 2 GPa.

3. The lapping process of claim 1, wherein said pressure on said contact surface and said multiple-phase working surface is at least 0.05 megapascals (MPa).

4. The lapping process of claim 1, wherein said multiple-phase working surface includes a cast-iron surface, wherein said first solid phase includes ferrite and said second solid phase includes graphite.

5. The lapping process of claim 4, wherein said graphite is predominantly a graphite selected from the group consisting of a spheroidal graphite and a laminar graphite.

6. The lapping process of claim 1, wherein said lapping of said multiple-phase working surface is an initial lapping procedure, wherein said pressure on said contact surface and said multiple-phase working surface during said initial lapping procedure is maintained above 0.05 megapascals (MPa), and wherein said initial lapping procedure is a sole, single-stage lapping procedure.

7. The lapping process of claim 1, wherein said lapping of said multiple-phase working surface is an initial lapping procedure, wherein said pressure on said contact surface and said multiple-phase working surface during said initial lapping procedure is maintained above 0.05 megapascals (MPa), and wherein prior to said initial lapping procedure, said multiple-phase working surface has a surface roughness ($R_a$) of at least 0.25 micrometers, and after said initial lapping procedure, a surface roughness ($R_a$) of said continuous phase is reduced below 0.05 micrometers.

8. The lapping process of claim 1, wherein a predominant fraction of said abrasive particles is alumina.

9. The lapping process of claim 1, wherein said abrasive particles are disposed in an abrasive paste containing 5% to 90%, by weight, of said abrasive particles and wherein said abrasive paste contains an organic acid having at least one unsaturated carbon-carbon bond.

10. The lapping process of claim 1, wherein said abrasive particles are disposed in an abrasive paste initially containing 5% to 90%, by weight, of said abrasive particles, and wherein at least 90%, by weight, of said abrasive particles have an initial particle size of at least 3 micrometers.

11. The lapping process of claim 1, wherein a specific lapping time [$t_{lap(specific)}$] to produce said lapped product is defined by a lapping time ($t_{lap}$) to produce said lapped product divided by a fraction (F) of said multiple-phase working surface that undergoes said lapping at any given moment, and wherein $t_{lap}$(specific) is less than 60 seconds.

12. The lapping process of claim 11, wherein said lapping of said multiple-phase working surface is an initial lapping stage, and wherein prior to said initial lapping stage, said multiple-phase working surface has a surface roughness ($R_a$) of at least 0.25, and after said initial lapping procedure, a surface roughness ($R_a$) of said continuous phase is reduced below 0.05.

13. The lapping process of claim 12, wherein said initial lapping stage is a sole, single-stage lapping stage.

14. The lapping process of claim 1, wherein said lapping is effected to incorporate pieces of said plurality of particles into said continuous phase, wherein said pieces incorporated into said continuous phase have a population density of at least 10,000 particles per square millimeter, and wherein a surface of said plurality of particles is at least partially covered with a solid catalyst.

* * * * *